United States Patent
Deshpande (10) Patent No.: US 11,142,136 B2
(45) Date of Patent: Oct. 12, 2021

(54) VEHICLE CARGO AREA ASSEMBLY

(71) Applicant: Nissan North America, Inc., Franklin, TN (US)

(72) Inventor: Neelamkumar R Deshpande, Novi, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 151 days.

(21) Appl. No.: 16/536,089

(22) Filed: Aug. 8, 2019

(65) Prior Publication Data

US 2021/0039565 A1 Feb. 11, 2021

(51) Int. Cl.
*B60R 13/01* (2006.01)
*B62D 33/027* (2006.01)

(52) U.S. Cl.
CPC .......... *B60R 13/01* (2013.01); *B62D 33/0273* (2013.01)

(58) Field of Classification Search
CPC ............................. B60R 13/01; B62D 33/0273
See application file for complete search history.

(56) References Cited

U.S. PATENT DOCUMENTS

| | | | | |
|---|---|---|---|---|
| 4,763,945 | A * | 8/1988 | Murray | B60R 13/01 296/39.2 |
| 5,664,822 | A * | 9/1997 | Rosenfield | B60R 13/01 16/250 |
| 9,016,764 | B2 | 4/2015 | Johnson et al. | |
| 2012/0200104 | A1* | 8/2012 | Olson | B60R 13/06 296/1.06 |
| 2015/0084361 | A1* | 3/2015 | McDermott, III | B62D 33/0273 296/57.1 |
| 2016/0221515 | A1* | 8/2016 | Burd | B60J 10/84 |
| 2019/0322225 | A1* | 10/2019 | Smith | B60R 13/01 |

* cited by examiner

*Primary Examiner* — Lori L Lyjak
(74) *Attorney, Agent, or Firm* — Global IP Counselors, LLP (57) ABSTRACT

A vehicle cargo area assembly includes a cargo area structure, a tailgate structure and a flexible cover assembly. The tailgate structure is supported to the cargo bed structure for pivotal movement with respect thereto between a closed orientation and an open orientation. The flexible cover assembly has a first end attached to the cargo area structure and a second end attached to the tailgate structure. The flexible cover assembly covers a gap defined between the cargo area structure and the tailgate structure with the tailgate structure in the open orientation.

15 Claims, 11 Drawing Sheets

VEHICLE CARGO AREA ASSEMBLY

BACKGROUND

Field of the Invention

The present invention generally relates to a vehicle cargo area structure that includes a flexible cover assembly. More specifically, the present invention relates to a vehicle cargo area structure that includes a cargo receiving surface, a tailgate and a flexible cover assembly, the flexible cover assembly covering a gap between the cargo receiving surface and the tailgate with the tailgate in an open orientation.

Background Information

Pickup trucks typically include a cargo area with a cargo receiving surface and a tailgate that moves between a vertical closed orientation and a horizontal open orientation. A gap is often defined between the tailgate and the cargo receiving surface with the tailgate in the open orientation.

SUMMARY

One object of the present disclosure is to provide a cargo area and a tailgate with a flexible cover assembly that covers a gap between the cargo area and the tailgate with the tailgate in the open orientation.

In view of the state of the known technology, one aspect of the present disclosure is to provide a vehicle cargo area assembly with a cargo area structure, a tailgate structure and a flexible cover assembly. The tailgate structure is supported to the cargo bed structure for pivotal movement with respect thereto between a closed orientation and an open orientation. The flexible cover assembly has a first end attached to the cargo area structure and a second end attached to the tailgate structure. The flexible cover assembly covers a gap defined between the cargo area structure and the tailgate structure with the tailgate structure in the open orientation.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
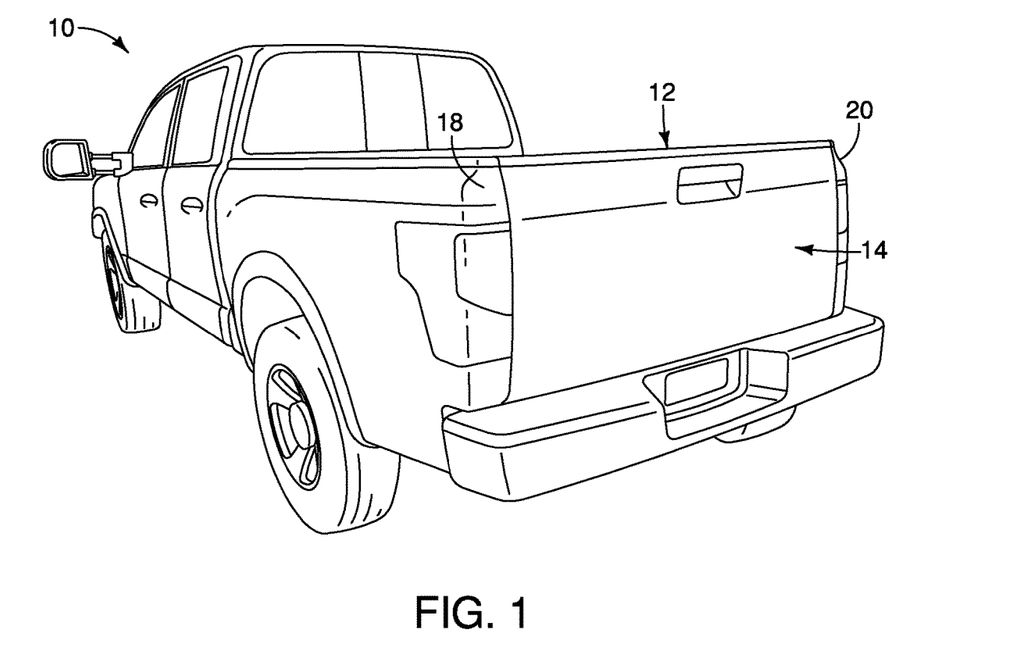
FIG. 1 is a perspective vehicle that includes a cargo area and a tailgate with the tailgate in a closed orientation in accordance with a first embodiment.
Figure 2:
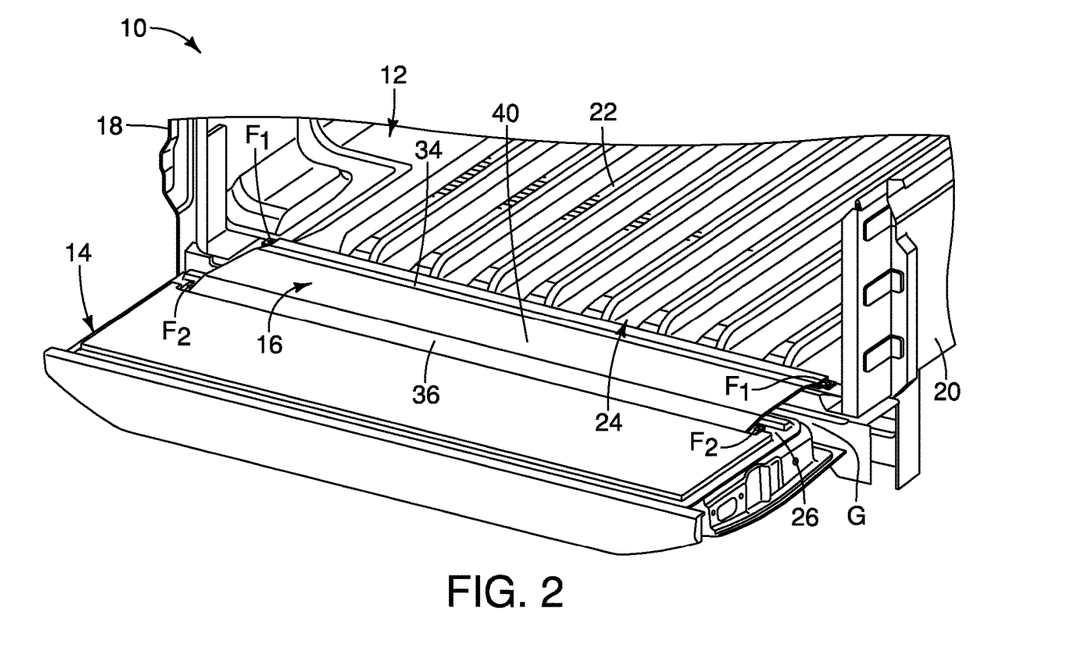
FIG. 2 is a rear perspective view of the cargo area of the vehicle showing the tailgate in an open orientation with a flexible cover assembly installed to the tailgate and cargo area covering a gap between the tailgate and the cargo area in accordance with the first embodiment.

Referring initially to FIGS. 1 and 2, a vehicle 10 with a cargo area structure 12, tailgate 14 and a flexible cover assembly 16 is illustrated in accordance with a first embodiment.

In FIG. 1, the vehicle 10 is depicted as a pick-up truck that includes the cargo area structure 12 and the tailgate 14. However, it should be understood from the drawings and the description hereinbelow that the vehicle 10 can alternatively be any vehicle design that includes a cargo area with an adjacent pivoting closure member, such as the tailgate 14, where a gap G is defined between a rear end of the cargo area structure 12 and the tailgate 14 (a pivoting closure member).

The cargo area structure 12 includes side walls 18 and 20, a cargo receiving surface 22 and the tailgate 14 located at a rearward end of the cargo receiving surface 22. The cargo receiving surface 22 can include a recessed surface portion 24 that is described in greater detail below. The cargo receiving surface 22 is a surface of the cargo area structure 12 receives and supports cargo, building materials and landscape materials and the like for movement by the vehicle 10 between one location and another.

The tailgate 14 (also referred to as the tailgate structure 14) is supported to the cargo bed structure 12 between the side walls 18 and 20 for pivotal movement about a pivot shaft that defines horizontal axis Ai between a closed orientation (FIG. 1) and an open orientation (FIG. 2). The tailgate structure 14 includes a recessed area 26 having a first recessed surface 28 and a second recessed surface 30. The first recessed surface 28 is vertically oriented with the tailgate structure in the open orientation. The second recessed surface 30 is horizontally oriented with the tailgate structure in the open orientation.

Figure 3:
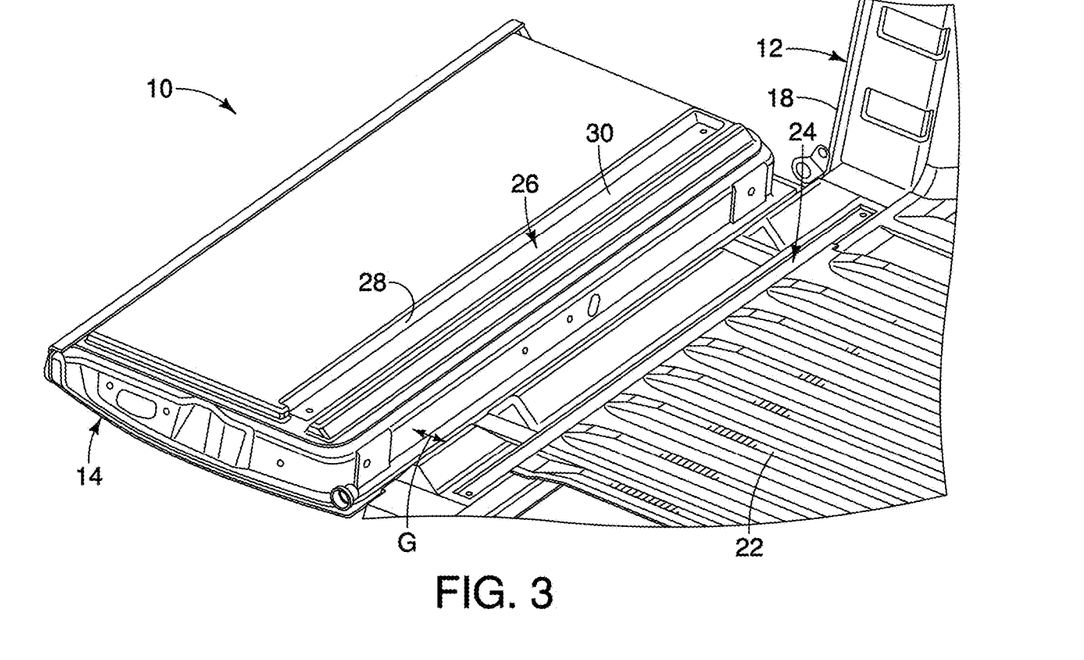
FIG. 3 is another perspective view of a rear section of the cargo area of the vehicle showing the tailgate in the open orientation with the flexible cover assembly removed in accordance with the first embodiment.
Figure 4:
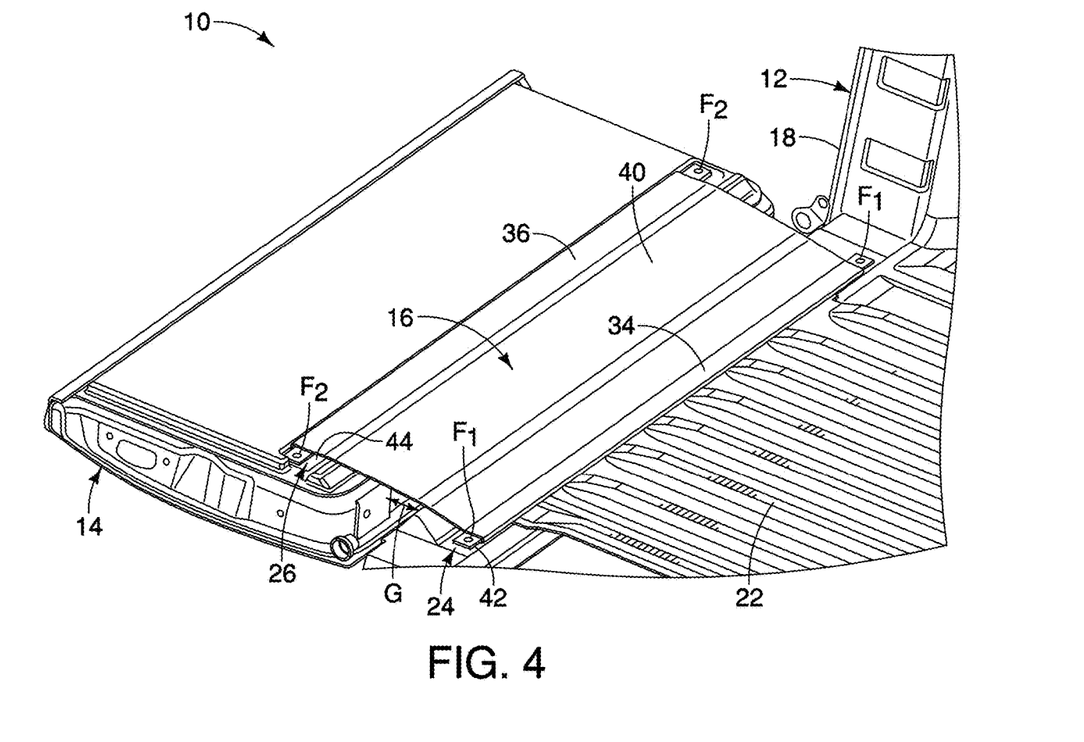
FIG. 4 is another perspective view similar to FIG. 3 with the flexible cover assembly installed to the cargo area and the tailgate in accordance with the first embodiment.
Figure 5:
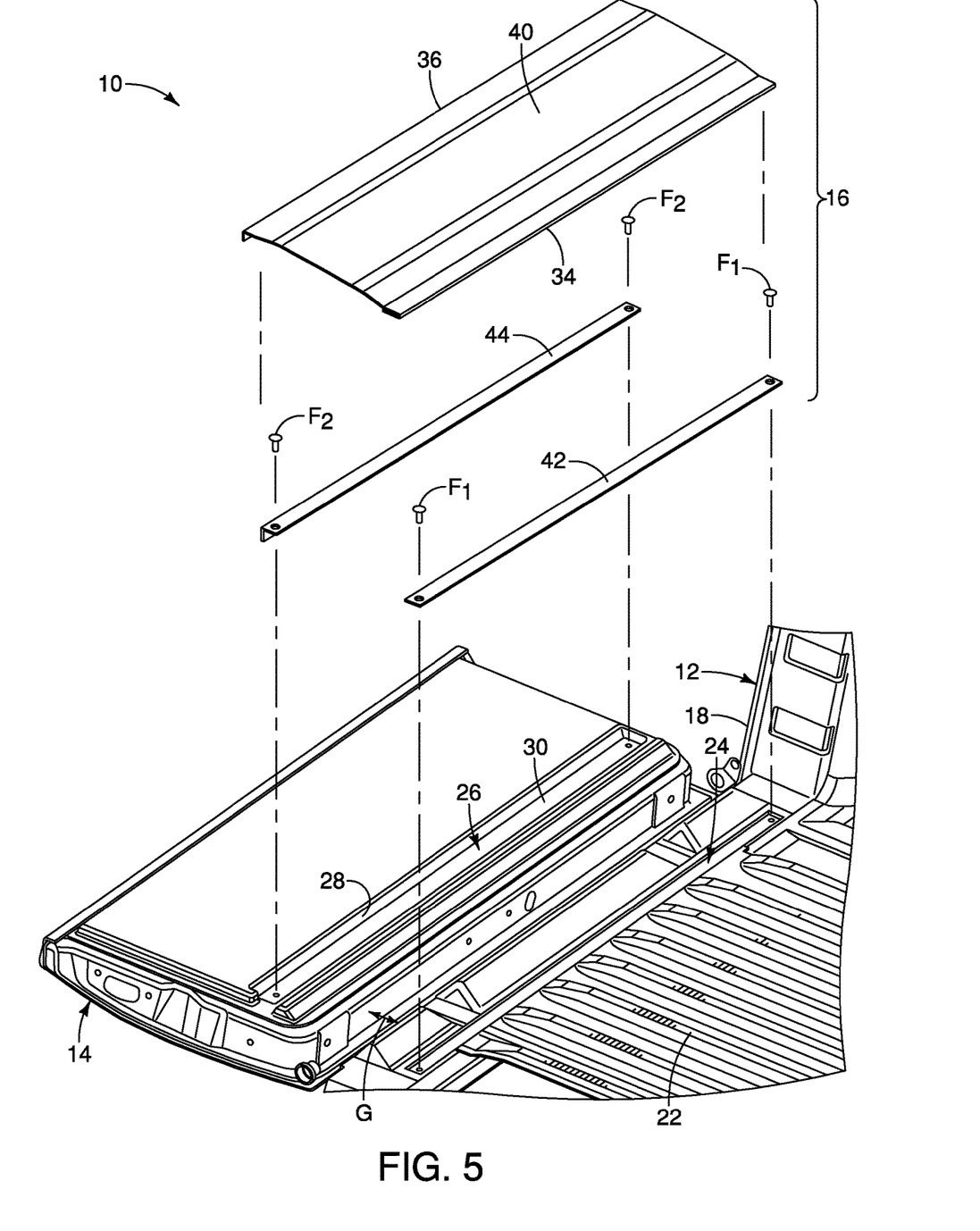
FIG. 5 is an exploded perspective view of the cargo area, the tailgate and the flexible cover assembly showing a flexible sheet-like material, a first attachment bracket, a second attachment bracket and fasteners of the flexible cover assembly in accordance with the first embodiment.
Figure 6:
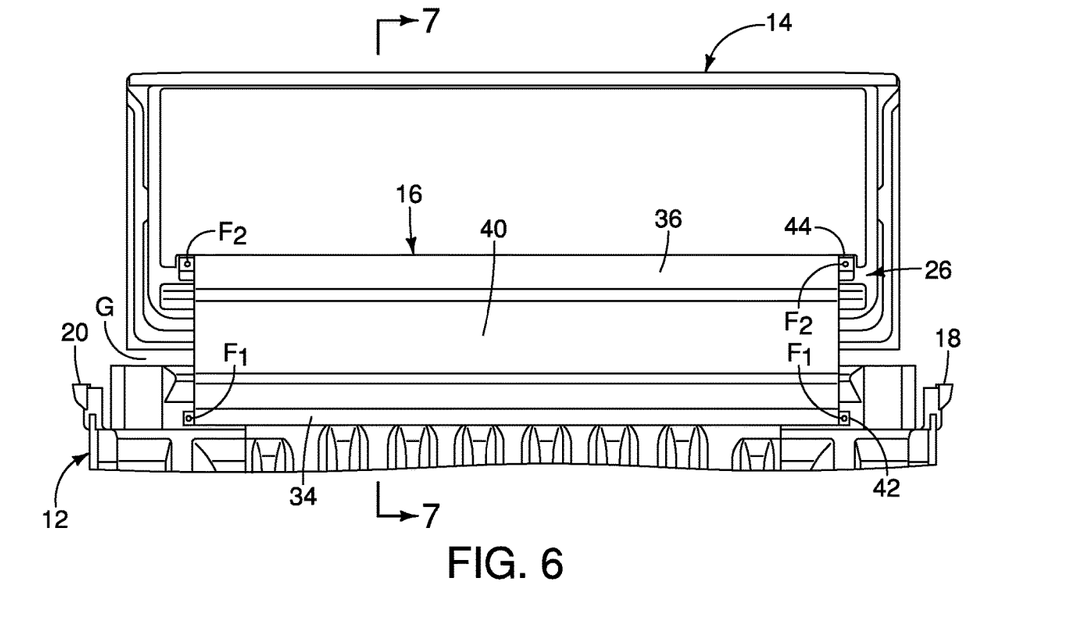
FIG. 6 is top view of the rear section of the cargo area of the vehicle showing the tailgate in the open orientation with the flexible cover assembly installed in accordance with the first embodiment.
Figure 7:
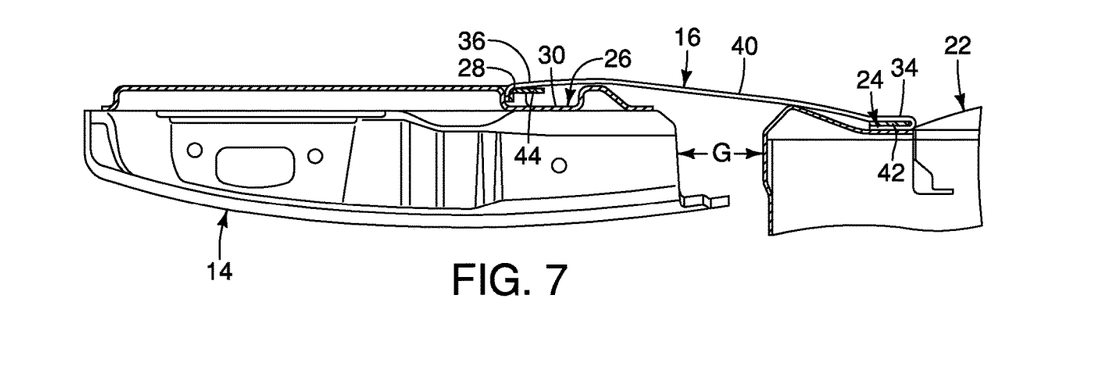
FIG. 7 is a part cross-sectional view of the cargo area and tailgate taken along the line 7-7 in FIG. 6 with the tailgate in the open orientation and the flexible cover assembly installed to the cargo area and the tailgate in accordance with the first embodiment.
Figure 8:
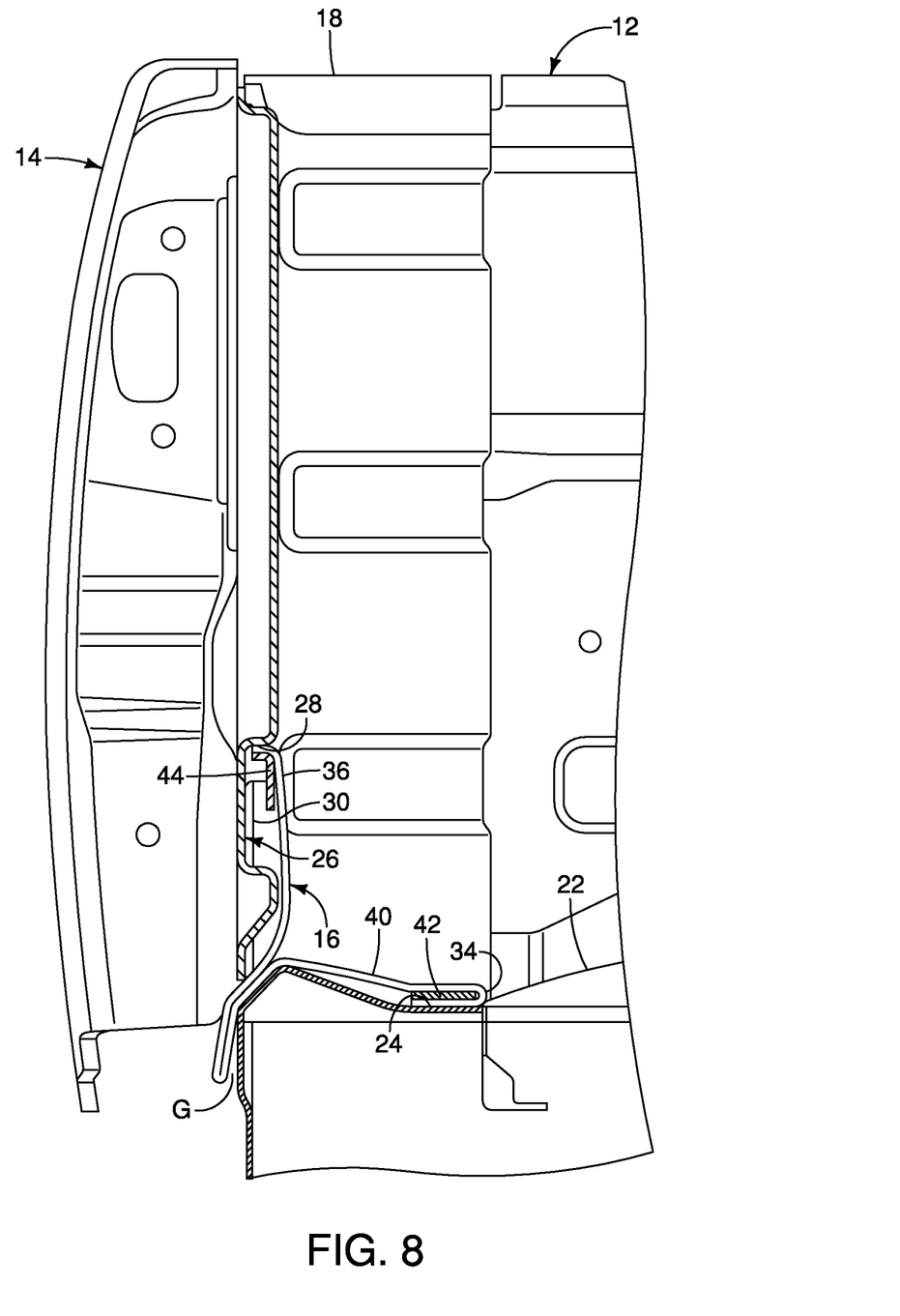
FIG. 8 is a part cross-sectional view of the cargo area and tailgate similar to FIG. 7, but with the tailgate in the closed orientation and the flexible cover assembly installed to the cargo area and the tailgate in accordance with the first embodiment.

As shown in FIGS. 2, 4, 5 and 6, the flexible cover assembly 16 has a first end 34 attached to the cargo receiving surface 22 of the cargo area structure 12 and a second end 36 attached to the tailgate structure 14. The flexible cover assembly 16 covers the gap G defined between the cargo area structure 12 and the tailgate structure 14 with the tailgate structure in the open orientation, as shown in FIGS. 3, 5 and 8.

As shown in FIG. 5, the flexible cover assembly 16 includes a flexible sheet-like material 40, a first attachment bracket 42 and a second attachment bracket 44. The flexible sheet-like material extends from the first end 34 to the second end 36 of the flexible cover assembly 16. The first attachment bracket 42 can be attached to the first end 34 of the flexible sheet-like material 40 by adhesive and/or mechanical fasteners (not shown). Alternatively, the first end 34 of the flexible cover assembly 16 can be wrapped around the first attachment bracket 42 and can further be configured with a pocket (not shown) that receives the first attachment bracket 42. Further, the first attachment bracket 42 attaches the first end 34 of the flexible sheet-like material 40 to the cargo area structure 12 by clamping a portion of the flexible sheet-like material 40 against the recessed surface portion 24 of the cargo receiving surface 22. Specifically, the first attachment bracket 42 attaches to the cargo receiving surface 22 covering the recessed surface portion 24. The portion of the flexible sheet-like material 40 is confined and clamped between the recessed surface portion 24 of the cargo receiving surface 22 and the first attachment bracket 42.

As shown in FIGS. 3, 4, 5 and 7-10, the recessed surface portion 24 is dimensioned to receive the first attachment bracket 42 (a flat metallic bar) such that with the first end 34 (a first portion) of the flexible sheet-like material 40 is clamped between the first attachment bracket 42 and the recessed surface portion 24 of the cargo receiving surface 22 of the cargo area structure 12.

Opposite ends of the first attachment bracket 42 can be permanently or removably attached to the recessed surface portion 24 of the cargo receiving surface 22 via mechanical fasteners $F_1$, or any of a variety of other mechanical fastening devices, such as rivets, snap-fitting fasteners or releasable buckles (see second amendment below).

As shown in FIGS. 5 and 7-10, the second attachment bracket 44 is an L-shaped metallic bar attaches to the second recessed surface 30 of the recessed area 26 of the cargo receiving surface 22.

Figure 9:
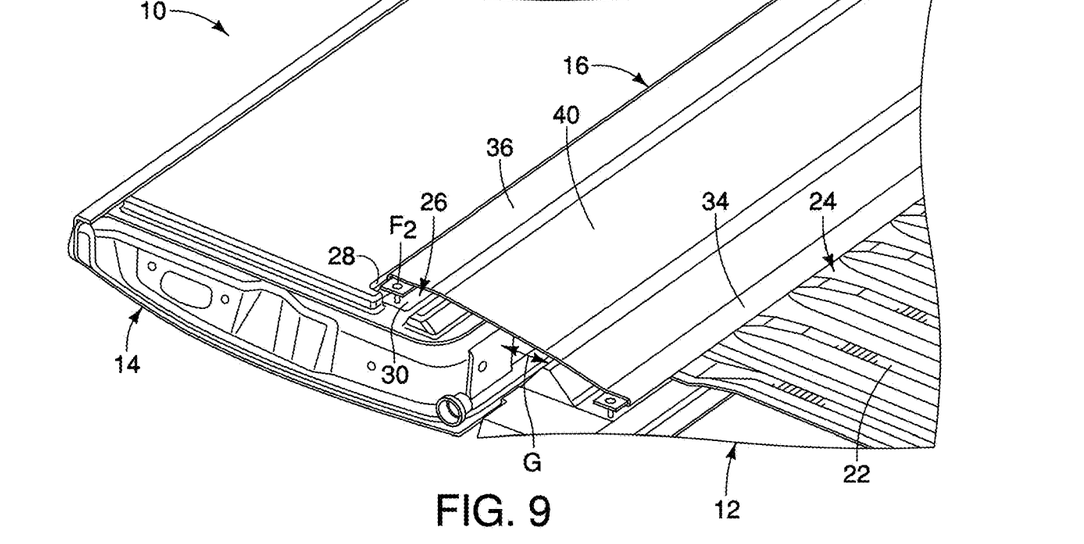
FIG. 9 is another perspective view of the rear section of the cargo area and tailgate with a rear end of the flexible cover assembly installed to a recessed area of the tailgate in accordance with the first embodiment.
Figure 10:
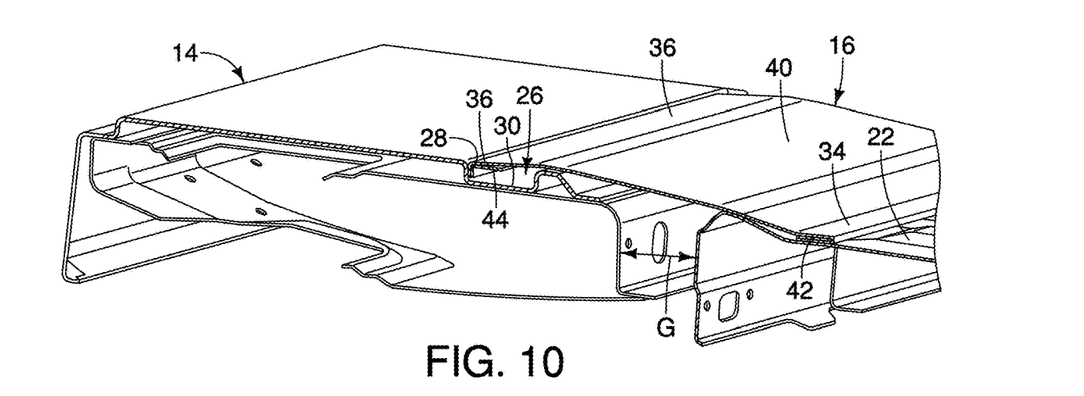
FIG. 10 is another perspective view of the rear section of the cargo area and tailgate showing the rear end of the flexible cover assembly and details of the recessed area of the tailgate in accordance with the first embodiment.
Figure 11:
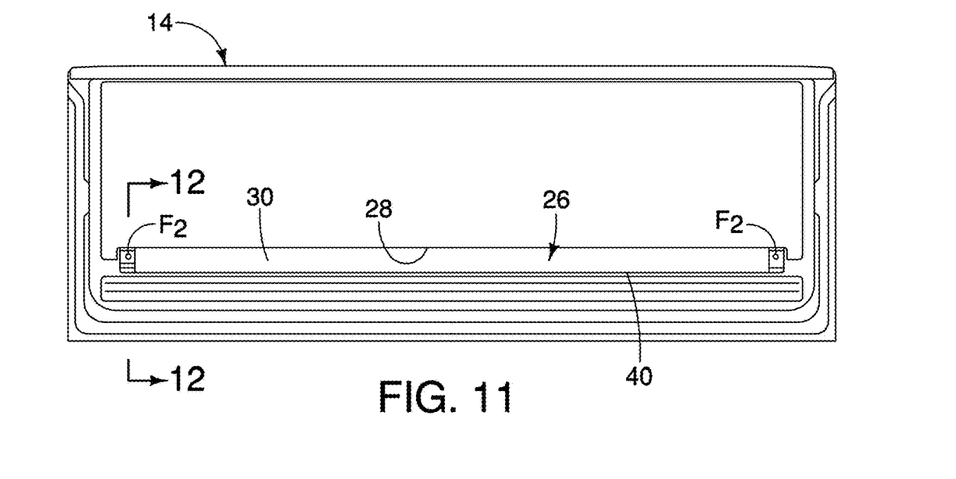
FIG. 11 is another top view similar to FIG. 6 showing the flexible cover assembly installed to the tailgate and rolled up, in a stowed orientation in accordance with the first embodiment.

Opposite ends of the second attachment bracket 44 further attach the second end 36 of the flexible sheet-like material to the tailgate structure 14 via mechanical fasteners $F_2$. The second attachment bracket 44 can be attached to the second end 36 of the flexible sheet-like material 40 by adhesive and/or mechanical fasteners (not shown). Alternatively, the second end 36 of the flexible cover assembly 16 can be wrapped around the second attachment bracket 44 and can further be configured with a pocket (not shown) that receives the second attachment bracket 44. Further, the second attachment bracket 44 attaches the second end 36 of the flexible sheet-like material 40 to the cargo area structure 12 by clamping a portion of the flexible sheet-like material 40 against the first recessed surface 28 of the recessed area 26 of the tailgate 14, as shown in FIGS. 9 and 11. Specifically, the second attachment bracket 44 attaches to the second recessed surface 30 of the recessed area 26 of the tailgate 14. The second end 36 of the flexible sheet-like material 40 is confined and clamped between the first recessed surface 28 and the second attachment bracket 44.

The flexible sheet-like material 40 can be made of any of a variety of durable materials such as, polyethylene, acrylic material, a carbon fiber material embedded in polyethylene and/or a textile or textile-like woven material that includes coated wire thread.

As shown in FIGS. 2, 4 and 6-7, the flexible cover assembly 16 covers the gap G defined between the cargo area structure 12 and the tailgate structure 14, with the tailgate structure 14 in the open orientation. When the cargo area structure 12 is filled with materials such as topsoil, stone or gravel, gardening related soft materials, or the like, the flexible cover assembly 16 limits and/or prevents such materials from falling into the gap G with the tailgate structure 14 in the open orientation. As shown in FIG. 9, with the tailgate structure 14 in the closed orientation, a portion of the flexible sheet-like material 40 can be confined within the gap G.

Figure 12:
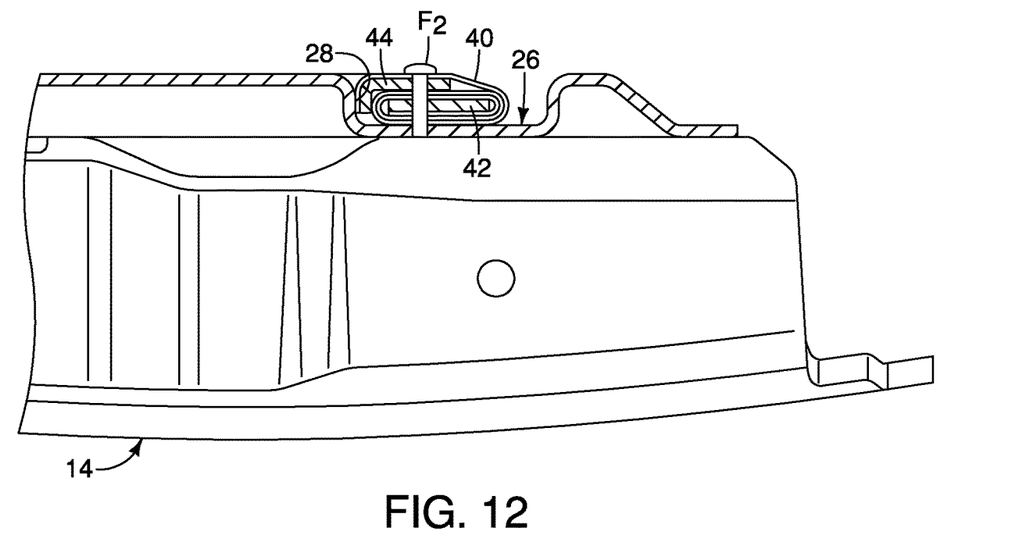
FIG. 12 is a cross-sectional view of a portion of the tailgate showing the flexible cover assembly installed to the tailgate, rolled up in a stowed orientation in accordance with the first embodiment.

The flexible cover assembly 16 can be removed from the cargo area structure 12 and tailgate 14 when not needed or can be left permanently installed. Alternatively, the flexible cover assembly 16 can be retained in a stowed orientation, as shown in FIGS. 11 and 12.

Specifically, the fasteners $F_1$ can be removed from the first attachment bracket 42, releasing the first end 34 of the flexible sheet-like material 40 from the cargo receiving surface 22 of the cargo area structure 12. The flexible sheet-like material 40 can then be rolled up around the first attachment bracket 42 and stowed in a space defined within the recessed area 26, as shown in FIG. 12. Further, the fasteners $F_2$ can be removed during the stowing process and reinstalled such that the fasteners $F_2$ extend through holes in both the second attachment bracket 44 and the first attachment bracket 42, as shown in FIG. 12.

Second Embodiment

Figure 13:
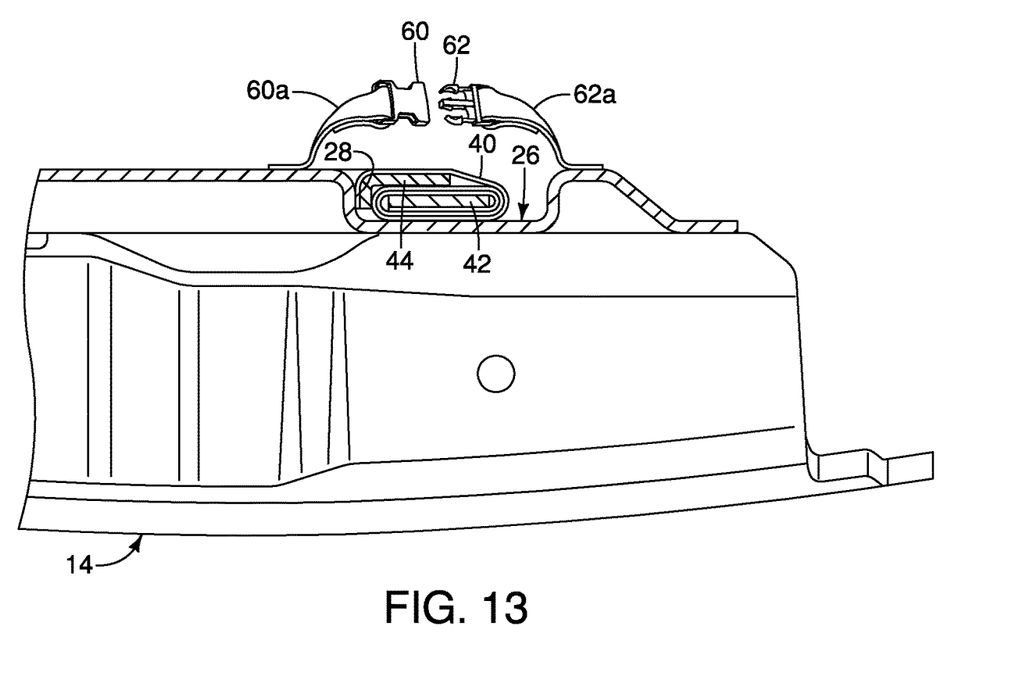
FIG. 13 is another cross-section of the portion of the tailgate showing the flexible cover assembly installed to the tailgate, rolled up in a stowed orientation as shown in FIGS. 11 and 12, with straps and buckles added to retain the flexible cover assembly in the stowed orientation in accordance with a second embodiment.

Referring now to FIG. 13, the flexible cover assembly 16 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

As shown in FIG. 13, the flexible sheet-like material 40 of the first embodiment is shown in the stowed orientation. The tailgate 14 and the flexible cover assembly 16 are as described in the first embodiment. However, in the second embodiment, a buckle having a first part 60, a strap 60a, a second part 62 and a second strap 62a have been added to the tailgate 14. Specifically, the strap 60a and the strap 62a are attached to the tailgate 14 at opposite sides of the recessed area 26. With the flexible sheet-like material 40 rolled up in the stowed orientation, the first part 60 and the second part 62 can be buckled to one another retaining the flexible sheet-like material 40 in the stowed orientation.

It should be understood from the drawings and the description herein that a plurality of first parts 60 and second parts 62 of buckles can be employed and attached by straps to the tailgate 14 and used to retain the flexible sheet-like material 40 in the stowed orientation.

Third Embodiment

Referring now to FIGS. 14-17, a vehicle 110 having a flexible cover assembly 116 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

Figure 14:
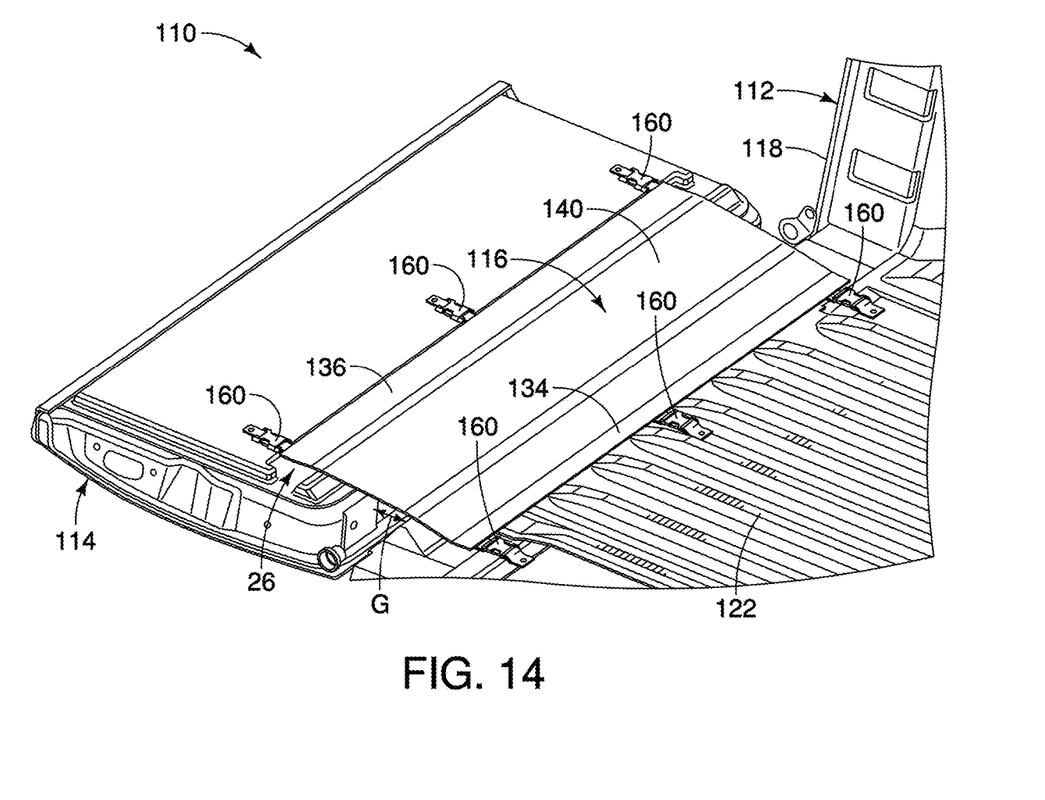
FIG. 14 is a perspective view of a rear portion of a cargo area showing a flexible cover assembly removably installed to the cargo area and the tailgate via a plurality of buckles in accordance with a third embodiment.

In the third embodiment, the cargo area structure 112 includes side walls 118 and 120 (not shown), a cargo receiving surface 122 and a tailgate 114 located at a rearward end of the cargo receiving surface 122.

The tailgate 114 is supported to the cargo bed structure 112 between the side walls 118 and 120 for pivotal movement about a pivot shaft that defines horizontal axis Ai between a closed orientation and an open orientation.

As shown in FIGS. 14-17, the flexible cover assembly 116 includes a flexible sheet-like material 140 that has a first end 134 attached to the cargo receiving surface 122 of the cargo area structure 12 and a second end 136 attached to the tailgate structure 114 via buckles that includes a first part 160 and a second part 162. The flexible cover assembly 116 covers the gap G defined between the cargo area structure 112 and the tailgate structure 114 with the tailgate structure 114 in the open orientation.

The cargo receiving surface 122 includes a plurality of the first part 160 of the buckles attached thereto. In the depicted second embodiment, three of the first part 160 of the buckles are fixedly attached to the cargo receiving surface 122. The plurality of the first parts 160 can alternatively be at least embedded beneath the cargo receiving surface 122 with only a necessary portion of the first part 160 exposed for attachment and detachment of the second part 162 from the first part 160 of each buckle.

Similarly, the tailgate 114 also includes a plurality of the first part 160 of the buckles attached thereto. In the depicted second embodiment, three of the first part 160 of the buckles are fixedly attached to the tailgate 114. The plurality of the first parts 160 can alternatively be at least embedded beneath a surface of the tailgate 114 with only a necessary portion of the first part 160 exposed for attachment and detachment of the second part 162 from the first part 160 of each buckle.

The flexible cover assembly 116 includes the flexible sheet-like material 40 with a plurality of the second parts 162 of the buckle attached thereto. In the second embodiment, there are three second parts 162 of the buckle fixed to the first end 134 and three second parts 162 of the buckle attached to the second end 136. It should be understood from the drawings of the second embodiment and the description herein that the specific number of buckles used can vary. In a vehicle having a small and narrow cargo area, perhaps only two buckles at the first end 134 and two buckles at the second end 136 are needed to secure the flexible cover assembly 116 in place. In a larger vehicle, perhaps 4-6 buckles at each of the first and second ends 134 and 136 are required. In other words, the number of buckles (first part 160 and second part 162) varies from vehicle to vehicle.

Figure 15:
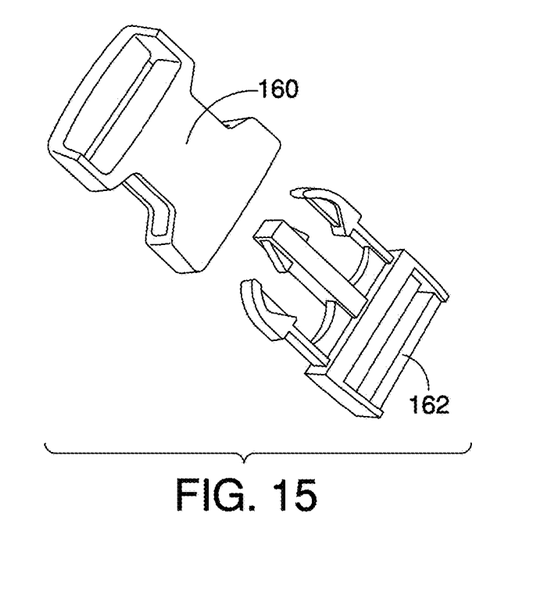
FIG. 15 is an exploded perspective view of a first part and a second part of one of the buckles removed from the flexible cover assembly in accordance with the third embodiment.
Figure 16:
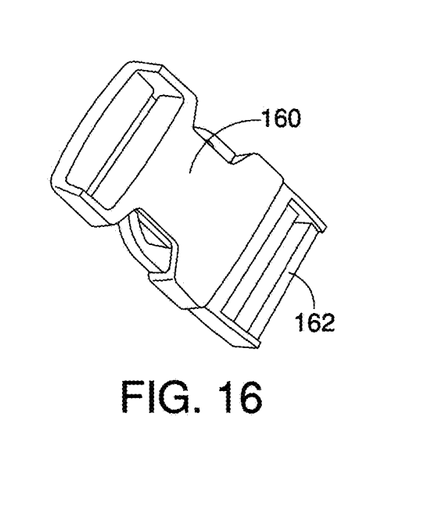
FIG. 16 is a perspective view of a first part and a second part of the one of the buckles removed from the flexible cover assembly shown snap-fitted to one another in accordance with the third embodiment.
Figure 17:
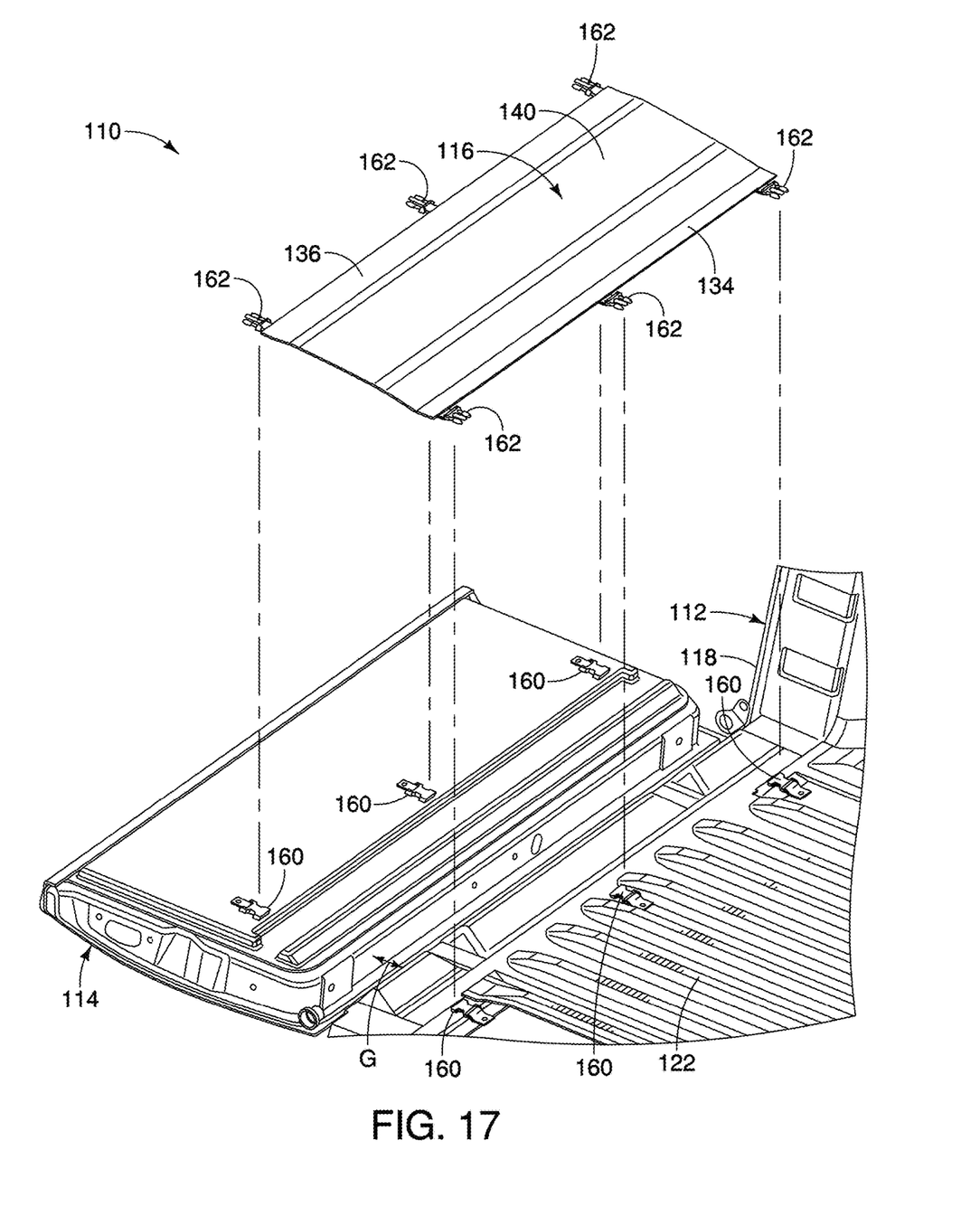
FIG. 17 is an exploded perspective view of the cargo area, the tailgate and the flexible cover assembly showing a flexible sheet-like material and a plurality of buckles of the flexible cover assembly in accordance with the third embodiment.

As shown in FIGS. 15 and 16, the first part 160 and the second part 162 of each of the buckles are configured to snap-fit to one another and be detached from one another by squeezing portions of the second part 162 that are exposed along opposite sides of the first part 160. Since such buckles are conventional structures, further description is omitted for the sake of brevity.

In the third embodiment, the flexible cover assembly 116 is easily installed to and detached from the cargo area structure 112 and the tailgate structure 114 and can be stored elsewhere within the vehicle 110 until needed.

In the third embodiment, the recessed surface portion 24 of the cargo receiving surface 22 in the first embodiment is not necessary. Further, the recessed area 26 of the tailgate 14 in the first embodiment is not necessary. As well, fasteners $F_1$, $F_2$, first attachment bracket 42 and second attachment bracket 44 are not necessary.

Fourth Embodiment

Figure 18:
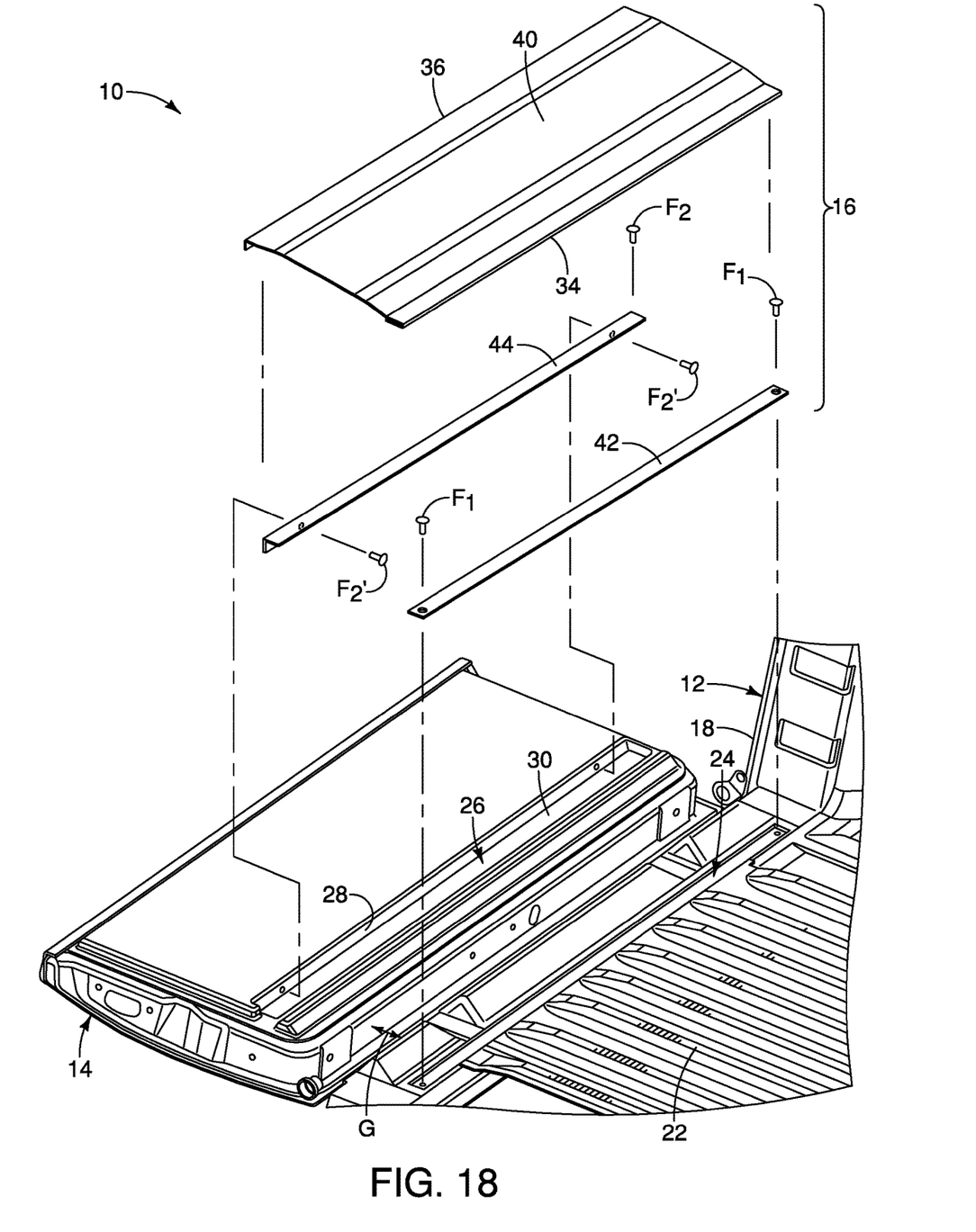
FIG. 18 is an exploded perspective view of the cargo area, the tailgate and a flexible cover assembly showing the flexible sheet-like material, the first attachment bracket, the second attachment bracket and fasteners of the flexible cover assembly in accordance with a fourth embodiment.
Figure 19:
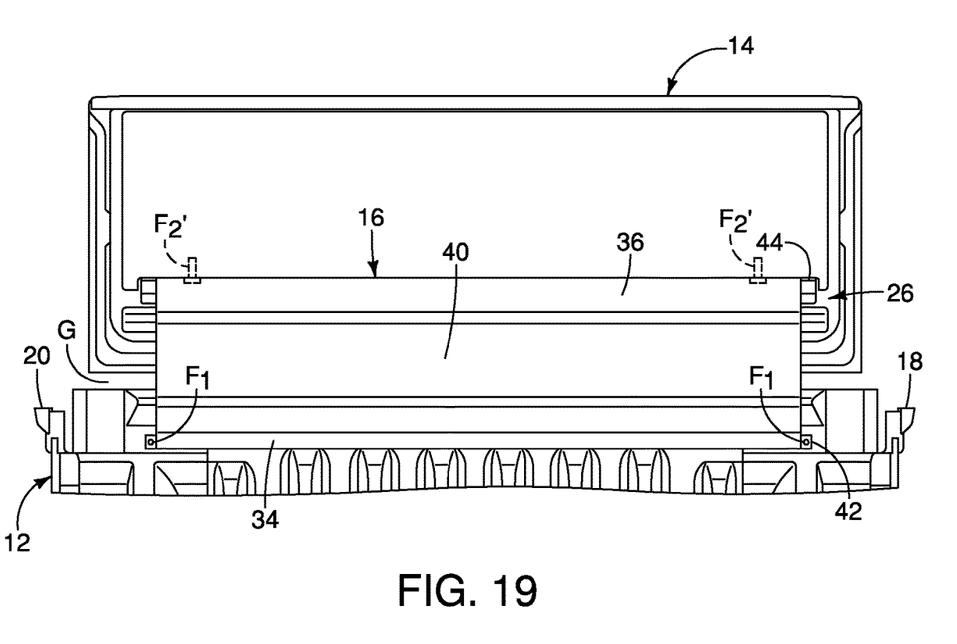
FIG. 19 is a top view of the tailgate showing the flexible cover assembly installed to the tailgate in an in-use orientation in accordance with the fourth embodiment.

Referring now to FIGS. 18 and 19, the flexible cover assembly 16 in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

In the fourth embodiment, the cargo area structure 12 and the tailgate 14 are as described above with respect to the first embodiment. Specifically, the cargo area structure 12 includes the recessed area 24 defined toward the rear of the cargo receiving surface 22. The tailgate 14 includes the recessed area 26 with the first recessed surface 28 and the second recessed surface 30, the first recessed surface 28 extending upright with the tailgate 14 in the open orientation and the second recessed surface 30 being horizontal with the tailgate 14 in the open orientation. The first recessed surface 28 and the second recessed surface 30 are perpendicular to one another.

In the fourth embodiment, the flexible cover assembly 16 includes the flexible sheet-like material 40, the first attachment bracket 42 and the second attachment bracket 44. The first attachment bracket 42 and the first end 34 of the flexible sheet-like material 40 (and the flexible cover assembly 16) attach to the recessed surface portion 24 of the cargo area structure 12, as described above in the first embodiment.

In the fourth embodiment, the second attachment bracket 44 and the second end 36 of the flexible sheet-like material 40 (and the flexible cover assembly 16) attach to the recessed area 26 of the tailgate 14 via a pair of fasteners $F_2$, that extended through an upright extending portion of the second attachment bracket 44 (with the tailgate 14 in the open orientation) and into corresponding openings in the first recessed surface 28 of the recessed area 26 of the tailgate 14, replacing the fasteners $F_2$ of the first embodiment.

The various vehicle features not mentioned above are conventional components that are well known in the art. Since these features are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle cargo area assembly. Accordingly, these terms, as utilized to describe the present invention should be interpreted relative to a vehicle equipped with the vehicle cargo area assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle cargo area assembly, comprising:
    a cargo area structure;
    a tailgate structure supported to the cargo bed structure for pivotal movement with respect thereto between a closed orientation and an open orientation;
    a flexible cover assembly having a flexible sheet-like material, a first attachment bracket and a second attachment bracket, with a first end attached to the cargo area structure and a second end attached to the tailgate structure, the flexible cover assembly covering a gap defined between the cargo area structure and the tailgate structure with the tailgate structure in the open orientation.

2. The vehicle cargo area assembly according to claim 1, wherein
    the flexible sheet-like material defines the first end and the second end of the flexible cover assembly.

3. The vehicle cargo area assembly according to claim 2, wherein
    the first attachment bracket attaches the first end of the flexible sheet-like material to the cargo area structure and the second attachment bracket attaches the second end of the flexible sheet-like material to the tailgate structure.

4. The vehicle cargo area assembly according to claim 1, wherein
    the flexible sheet-like material is a made of polyethylene.

5. The vehicle cargo area assembly according to claim 1, wherein
    the flexible sheet-like material is a made of an acrylic material.

6. The vehicle cargo area assembly according to claim 1, wherein
    the flexible sheet-like material is a made of a carbon fiber material embedded in polyethylene.

7. The vehicle cargo area assembly according to claim 1, wherein
    the flexible sheet-like material is a made of a woven material that includes coated wire thread.

8. The vehicle cargo area assembly according to claim 1, wherein
    the first attachment bracket includes a flat metallic bar with attachment structures at opposite ends thereof for attachment to the cargo area structure.

9. The vehicle cargo area assembly according to claim 8, wherein
    the first end of the flexible sheet-like material includes a first portion that wraps around the flat metallic bar such that with the flat metallic bar attached to the cargo area structure at least a portion of the first portion is clamped between the flat metallic bar and an upper surface of the cargo area structure.

10. The vehicle cargo area assembly according to claim 1, wherein
    the second attachment bracket includes an L-shaped metallic bar with attachment structures at opposite ends thereof for attachment to the tailgate.

11. The vehicle cargo area assembly according to claim 10, wherein
    the second end of the flexible sheet-like material includes a second portion that wraps over two perpendicular surfaces of the L-shaped metallic bar such that with the L-shaped metallic bar attached to the cargo area structure at least a portion of the second portion is clamped between the L-shaped metallic bar and a surface of the tailgate assembly.

12. The vehicle cargo area assembly according to claim 11, wherein
the first attachment bracket includes a flat metallic bar with attachment structures at opposite ends thereof for attachment to the cargo area structure.

13. The vehicle cargo area assembly according to claim 12, wherein
the first end of the flexible sheet-like material includes a first portion that wraps around the flat metallic bar such that with the flat metallic bar attached to the cargo area structure at least a portion of the first portion is clamped between the flat metallic bar and an upper surface of the cargo area structure.

14. The vehicle cargo area assembly according to claim 11, wherein
the tailgate structure includes a recessed area having a first recessed surface and a second recessed surface, the first recessed surface being vertically oriented with the tailgate structure in the open orientation and the second recessed surface being horizontally oriented with the tailgate structure in the open orientation, and
the L-shaped metallic bar attaches to the second recessed surface and clamps the second end of the flexible sheet-like material between the L-shaped metallic bar and the first recessed surface of the tailgate assembly.

15. The vehicle cargo area assembly according to claim 9, wherein
the cargo area structure includes a recessed surface portion dimensioned to receive the flat metallic bar such that with the first portion is clamped between the flat metallic bar and the recessed surface portion of the cargo area structure.

* * * * *